United States Patent [19]
Fielden

[11] Patent Number: 5,802,337
[45] Date of Patent: Sep. 1, 1998

[54] METHOD AND APPARATUS FOR EXECUTING LOAD INSTRUCTIONS SPECULATIVELY

[75] Inventor: Kent G. Fielden, Sunnyvale, Calif.

[73] Assignee: Intel Corporation, Santa Clara, Calif.

[21] Appl. No.: 890,182

[22] Filed: Jul. 9, 1997

Related U.S. Application Data

[63] Continuation of Ser. No. 580,749, Dec. 29, 1995, abandoned.

[51] Int. Cl.$^6$ .................................................. G06F 9/312
[52] U.S. Cl. ........................ 395/392; 395/393; 395/394; 395/580; 395/581
[58] Field of Search ...................... 395/580, 376, 395/700, 800, 393, 392, 584, 585, 586, 588, 591

[56] References Cited

U.S. PATENT DOCUMENTS

| | | | |
|---|---|---|---|
| 5,278,985 | 1/1994 | Odnert et al. | 395/700 |
| 5,420,991 | 5/1995 | Konigsfeld et al. | 395/375 |
| 5,421,022 | 5/1995 | McKeen et al. | 395/800 |
| 5,526,499 | 6/1996 | Bernstein et al. | 395/375 |
| 5,634,023 | 5/1997 | Adler et al. | 395/591 |

*Primary Examiner*—William M. Treat
*Assistant Examiner*—Saleh Najjar
*Attorney, Agent, or Firm*—Blakely, Sokoloff, Taylor & Zafman

[57] ABSTRACT

A load is executed speculatively as a dismissible load instruction, which does not take exceptions, and a check instruction, which is in the same format as the dismissible load, that when executed determines whether an exception should be taken on the dismissible load. In this manner, a load may be executed speculatively while ensuring that an exception occurs at the same time it would have occurred had the load been executed non-speculatively.

14 Claims, 2 Drawing Sheets

METHOD AND APPARATUS FOR EXECUTING LOAD INSTRUCTIONS SPECULATIVELY

This is a continuation of application Ser. No. 08/580,749, filed Dec. 19, 1995, now abandoned.

FIELD OF THE INVENTION

The present invention relates to the field of computer systems; more particularly, the present invention relates to executing load instructions before it is known that they can be legally executed (i.e., speculatively).

BACKGROUND OF THE INVENTION

Some computers have the capability to execute instructions out of order. In other words, the central processing unit (CPU) and the computer system is capable of executing one instruction before a previous instruction in the instruction execution stream. To execute computer programs more quickly in a computer system, it is often helpful to move instructions earlier in the execution stream than the programmer had initially planned. In particular, it is useful to move instructions to a location prior to branch instructions, the execution of which determine whether the moved instructions would have been executed. Such instructions are called speculative instructions because they are executed prior to knowing that the instructions are going to be executed (since the branch instruction has not been executed yet). However, memory operations typically must be executed in order to maintain memory consistency, especially when their execution would create incorrect results.

Exceptions may arise as a result of program execution. Although it is desirable to execute instructions speculatively, it is important not to take exceptions on such instructions where an instruction potentially may not actually be executed. As discussed above, whether these speculative instructions will actually be executed is based on whether a branch (or other conditional statement) is actually taken or not. Thus, when instructions are speculative, one cannot take an exception because the path that caused the exception might not have ever occurred.

One prior art solution to execute programs more quickly is to move only those instructions that are proven not to cause exceptions. This does work well for most integer instructions as they, in general, do not cause exceptions. Loads and divides can cause exceptions. A load instruction allows a central processing unit that processes data in a computer system to receive the data from memory. A load instruction typically specifies an address to a location in memory at which the desired data is stored. The load instruction also usually specifies the amount of data that is desired. Using the address and the amount of data specified, the memory may be accessed and the desired data obtained. It is very difficult to prove ahead of time that a load will not cause exception.

One solution to allow a program to execute more quickly is to move a load instruction earlier in the execution stream and replace them with loads which do not take exceptions. These are called dismissible loads. This is an effective solution. However, the program may no longer raise an exception which would have been raised had the change in program order not been made.

Another solution may be to use an additional bit in each register result indicating whether an instruction would have caused an exception. This allows for general speculation and still maintains the knowledge that an exception occurred. If using a register that has the bit set to indicate an exception occurred, the register is merely passed along with its results. A disadvantage of this approach is that it requires an additional register state which must be saved and restored.

The present invention allows load instructions to be moved earlier in the instruction stream for speculative execution while still allowing exceptions to occur when they should.

SUMMARY OF THE INVENTION

A method and apparatus for speculatively executing a load is described. The present invention includes a method and apparatus for executing a dismissible load instruction as part of, and earlier in, a series of executable instructions than the load. The present invention also includes a method and apparatus for executing another instruction, as part of the series of executable instructions, to determine whether to take an exception for the dismissible load instruction.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

The method and apparatus for executing load instructions is described. In the following detailed description of the present invention, numerous specific details are set forth, such as specific instruction names, numbers of ports, etc., in order to provide a thorough understanding of the present invention. However, it will be apparent to one skilled in the art that the present invention may be practiced without these specific details. In other instances, well-known structures and devices are shown in block diagram form, rather than in detail, so as not to obscure the present invention.

The present invention allows loads to be moved up earlier in the execution stream than originally programmed (i.e., executed speculatively) while still allowing exceptions to occur at the same time the exception would have been generated for the load if the load had not been executed speculatively. In order to move the load earlier in the instruction stream, the load is replaced with a dismissible load which, by definition, does not generate an exception, while a check instruction is left in the load's original position in the program order (execution stream).

In essence, a load instruction is moved up, thereby making it speculative. This load instruction does not take an exception. When the load instruction is executed, the data is either valid or not. Then, at the location in the execution stream where the load was originally ordered to occur, a check is made to see if an exception would have occurred. If the load would have caused an exception, the exception would have to be taken.

Figure 1:
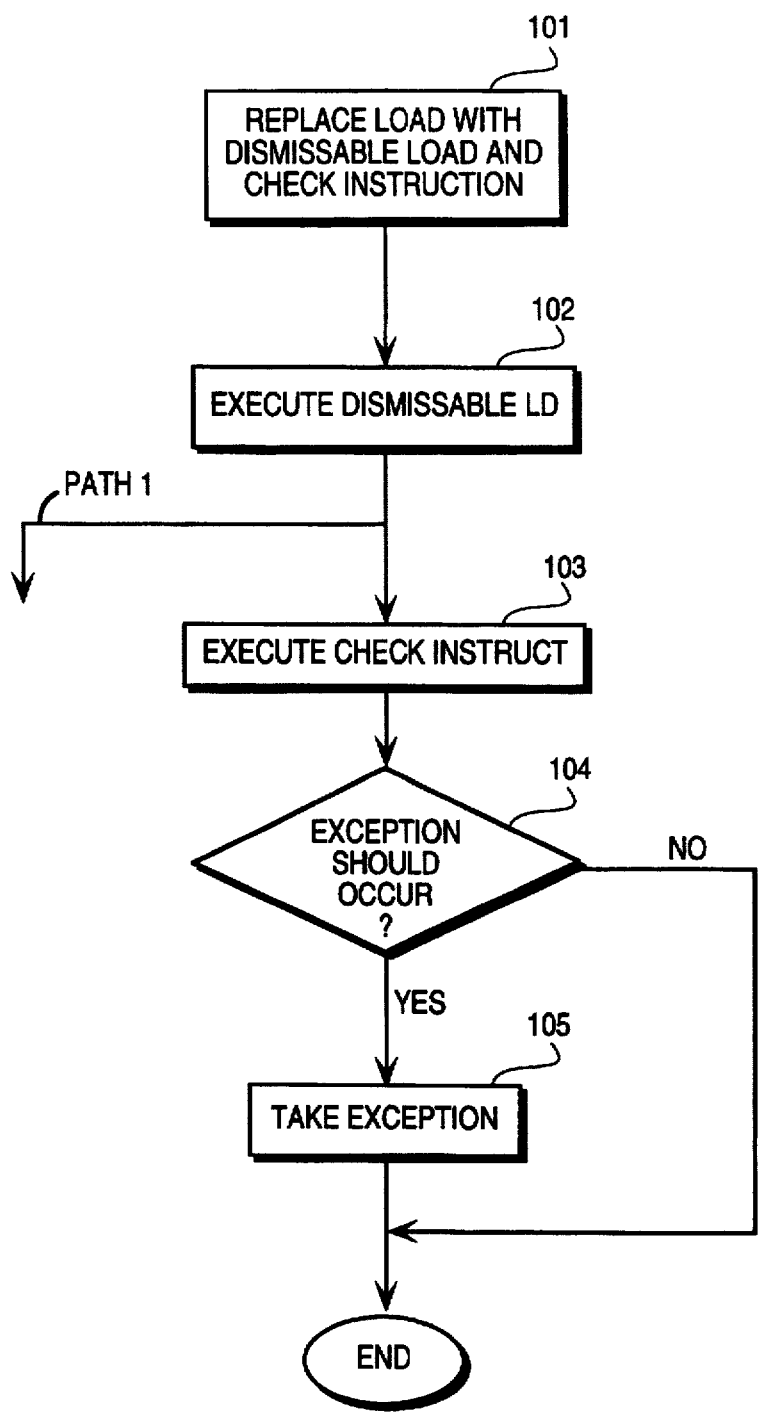
FIG. 1 is a flow diagram illustrating the process of the present invention.
Figure 2:
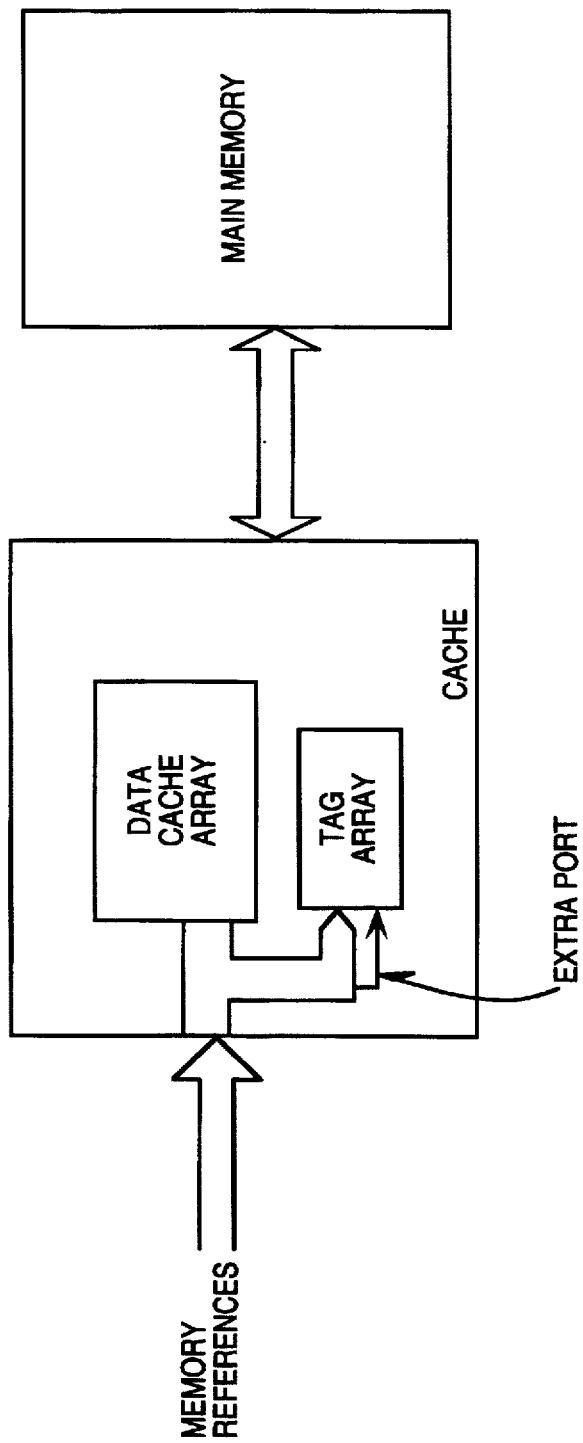
FIG. 2 is a block diagram of the memory system of the computer system of the present invention.

FIG. 1 illustrates the process of the present invention. Referring to FIG. 1, the process begins by replacing (e.g., decoding into) a load, which is in an initial position in the program order, with a dismissible load and a check instruction (processing block 101). In one embodiment, this replacement is performed by a computer compiling the original program. The compiler reorders the program by moving the dismissible load to a position in the compiled program order that is prior to the original position of the load in the original program order. The compiler places the check instruction at the same initial position in the program order as the original load. In an alternate embodiment, the replacement may be performed by a reorder buffer in a processor.

Next, after compiling the program, the program is executed in a computer system, and typically by one or more processors. During execution of the program, the dismissible load is executed (processing block 102). After execution of the dismissible load, the computer system may potentially branch to other portions of code and continue to execute, as shown by path 1, or may proceed to processing block 103. After executing instructions in execution path 1, the processor may eventually return to processing block 103.

Later, the check instruction is executed (processing block 103) to determine if an exception should have occurred on the dismissible load instruction, except for the fact that, by definition, an exception couldn't have occurred during its execution.

Then, a test determines if an exception should occur (processing block 104). If the results of execution of the check instruction do not indicate that an exception should have occurred, the execution of the program continues, such that the load was executed speculatively. If results of execution of the check instruction indicate that an exception would have occurred (except for the load's status being dismissible), then an exception occurs at this time, such that the exception occurs at the same time it would have occurred had the original load been executed non-speculatively.

If an exception is to be taken, a jump or branch occurs to recovery code that identifies the dismissible load that would have caused the exception (as if it were not "dismissible"). The dismissible load could be identified through the use of a table that maintains all executed dismissible load operations. Once the dismissible load is identified, exception processing handles the exception in a manner well-known in the art. In one embodiment, the recovery code re-executes the load. This may be required when the result of following another execution path causes the results of the dismissible load to indicate that an exception occurred even though one did not, such as, for example, its results are removed from a cache memory even though no exception occurred.

Thus, re-execution would bring the data back into the cache.

In the present invention, the check instruction is in the same form as the load instruction. The check instruction uses a load instruction format to determine if an exception should be taken for the earlier dismissible load instruction, instead of producing a typical load operation result. In other words, the check instruction is issued with the same address as the dismissible load instruction, which is the same as the original load. If the instruction executes with the address and does not generate an exception, then the dismissible load would not have generated an exception itself. However, if using the same address, the check instruction results in an exception being generated, then an exception would have occurred with the previous dismissible load. If so, it takes the exception.

The present invention allows a load which follows a branch instruction in the original execution stream may be moved before the branch in the execution stream. If this occurs, the data is made available before the branch is executed. In other words, the data is acquired from memory prior to whether this particular load was in the path of execution that would result from execution of the branch. Even so, in the present invention, the check instruction determines if an exception would have occurred.

An exemplary instruction flow (in assembler) is shown below as a portion of a program in execution order. Note that the "br" represents a branch institution, the "ld" represents a load institution, the "add" represents an add instruction, and the lower case "r" is a register designation:

| ... | | |
|---|---|---|
| br | r5, | l1 |
| ld | 4(r6), | r21 |
| add | r21,1, | r22 |
| ... | | |

After the replacement of the load (ld) and reordering, the program in execution order is as follows:

| ... | | | |
|---|---|---|---|
| ld | 4(r6), | r21 | // load value here |
| add | r21,1, | r22 | |
| ... | | | |
| br | r5, | l1 | |
| checkld | | 4(r6) | // check for exception here |
| ... | | | |

Since the load is moved earlier in the execution stream, other instructions which follow that load that do not take exceptions, such as integer arithmetic operations. If the moved up load then causes an exception, the subsequent integer arithmetic instructions will not take exceptions because they do not generally cause exceptions. In the previous example, the add operation was moved up to proceed following the execution of the load.

In one embodiment, the present invention is implemented using a standard memory system. The dismissible load instruction and its effect on the memory system operates in the same manner as in the prior art.

The check instruction, on the other hand, may be implemented using the standard cache memory design. During execution of the dismissible load instruction, a standard memory reference examines tags in a tag array to determine if it is in the cache memory. At the same time, a reference to the data cache array occurs. More recent cache subsystems are multi-ported, thereby allowing multiple memory references to access the cache memory at the same time. The check instruction determines whether an exception would have occurred by examining the cache memory (or other memory) for the memory reference. If the memory reference is present, then no exception occurred during execution of the earlier load. However, if the access to the cache memory subsystem does not locate the memory reference, then it is assumed that the load cause an exception.

To reduce cost, in one embodiment, execution of the check instruction is only an access to the tag array. This can be done through the addition of an additional port to the tag array. Thus, a port to the data cache array is not necessary for the load check instruction. This reduces cost since the additional porting circuitry is generally expensive and the tag array is much smaller and has a lower number of entries than the data cache memory, leading to a further reduced cost. During the execution of a check instruction, a memory reference is made to the tag array. Because the check instruction and the dismissible load instruction share the same address, then its presence in the tag array indicates that the dismissible load succeeded and did not generate an exception. If a tag is not present in the tag array, then an exception should have been generated for the dismissible load. A signal from the tag array indicates whether the address is contained in the tag array. At this point, the processor takes an exception.

Note that because of the extra port, a check instruction and a different load instruction may be executed at the same time.

In an alternate embodiment, execution of a check instruction may be performed by accessing a table that contains a list of all dismissible loads which have been executed. If execution of the dismissible load failed, the table would not have an entry corresponding to the address in the check instruction or would indicate that the load caused an exception.

It should be noted that if a process exchange occurs during the time between the dismissible load and the check instruction, the entire cache memory may be rewritten and all the tags may no longer be present.

Therefore, a check at this time might indicate that the load failed when, in essence, it actually did not fail. Because the dismissible load and the check instruction are typically only a few cycles apart, the chance of a process exchange are very small. But it should be noted that the results of execution of the check instruction, in this case, are that the dismissible load may have to be retried in order to ensure that no exception occurs. Note that this is a common feature in speculative execution systems.

The present invention is particularly advantageous in order execution machines which do not in themselves rearrange instruction execution. In such a case, a compiler performs the replacement of the load with the dismissible load and a check instruction and reorders the program.

Whereas many alterations and modifications of the present invention will no doubt become apparent to a person of ordinary skill in the art after having read the foregoing description, it is to be understood that the various embodiments shown and described by way of illustration are in no way intended to be considered limiting. Therefore, references to details of various embodiments are not intended to limit the scope of the claims which in themselves recite only those features regarded as essential to the invention.

Thus, a computer system that performs loads speculatively has been disclosed.

I claim:

1. A method for speculatively executing a load having an original position in a series of executable instructions and having a load address, said method comprising the steps of:
   converting the load instruction into a dismissible load instruction;
   moving the dismissible load instruction to a location prior to the original position of the load in the series of executable instructions;
   placing a check instruction at the original position of the load wherein the check instruction includes the load address of the load;
   executing the dismissible load instruction;
   executing the check instruction to determine whether to take an exception for the dismissible load instruction.

2. The method defined in claim 1 wherein the step of converting occurs during compiling.

3. The method defined in claim 1 further comprising the step of taking an exception on the dismissible load instruction if execution of the check instruction indicates that an exception would have occurred on the dismissible load instruction if not dismissible.

4. The method defined in claim 1 wherein the step of executing said another instruction comprises:
   accessing a tag array of a cache memory to locate a tag associated with a memory reference address of the dismissible load instruction;
   taking the exception for the dismissible load instruction if the tag is not located; and
   determining not to take any exception for the dismissible load instruction if the tag is located.

5. The method defined in claim 1 wherein the exception, if any, occurs at the same time execution of the load would have resulted in generation of the exception had the load been executed non-speculatively.

6. The method defined in claim 1 wherein the check instruction occurs at the position in the series of executable instructions.

7. A method for executing a load located at a first position in a plurality of instructions and having a load address, said method comprising the steps of:
   converting the load into a dismissible load instruction with the load address at a second position in the plurality of instructions, wherein the second position is prior to the first position and a check instruction is placed at the first position, the check instruction having an instruction format that includes the load address;
   executing the dismissible load instruction prior to when the load would have been non-speculatively executed;
   executing the check instruction to determine whether an exception is to be taken for the dismissible load instruction, such that the load is executed speculatively if no exception is taken for the dismissible load instruction.

8. The method deferred in claim 7 further comprising the step of taking the exception for the dismissible load instruction if execution of the check instruction determines that the load would have generated an exception had the load been executed non-speculatively.

9. The method defined in claim 8 wherein the exception, if any, occurs at the same time execution of the load would have resulted in generation of the exception had the load been executed non-speculatively.

10. The method defined in claim 7 wherein the step of converting occurs during compiling.

11. The method defined in claim 7 wherein the step of executing said check instruction comprises:
   accessing a tag array of a cache memory to locate a tag associated with a memory reference address of the dismissible load instruction;
   taking the exception for the dismissible load instruction if the tag is not located; and
   determining not to take any exception for the dismissible load instruction if the tag is located.

12. A processor that executes a load instruction, said processor comprising:
   a processing unit;
   a cache memory coupled to the processing unit, wherein the cache memory comprises a data cache random access memory (RAM) have a first number of ports to allow access to data therein; and
   a tag array having an extra port;
   wherein the processing unit executes a check instruction at a position of the load instruction, wherein the load instruction is converted into a dismissible load instruction causing an access to the tag array through the extra port without accessing the data cache RAM, wherein the processing unit executes the check instruction at the position of the load instruction to determine whether an exception is to be taken on the dismissible load instruction executed speculatively.

13. The processor defined in claim 12 wherein the processing unit executes a check instruction that causes access to the tag array.

14. A method for executing a plurality of instructions, including a load located at a first position in the plurality of instructions, wherein the load has a load address, said method comprising the steps of:

converting the load into a dismissible load instruction with the load address and a check instruction located at the first position and having an instruction format that includes the load address;

moving the dismissible load to a position in the execution stream earlier than the first position;

moving at least one other instruction dependent on data from the load to a position prior to the first position yet after the second position in the execution stream;

executing the dismissible load prior to when the load would have been non-speculatively executed;

executing said at least one other instruction, such that said one other instruction is executed prior to when it would have been executed, if not moved;

executing the check instruction to determine whether an exception is to be taken for the dismissible load, such that the load is executed speculatively if no exception is taken for the dismissible load instruction.

* * * * *